Feb. 22, 1955   M. O. PETROFF ET AL   2,702,883
VIBRATION PICKUP
Filed May 12, 1951   2 Sheets-Sheet 1
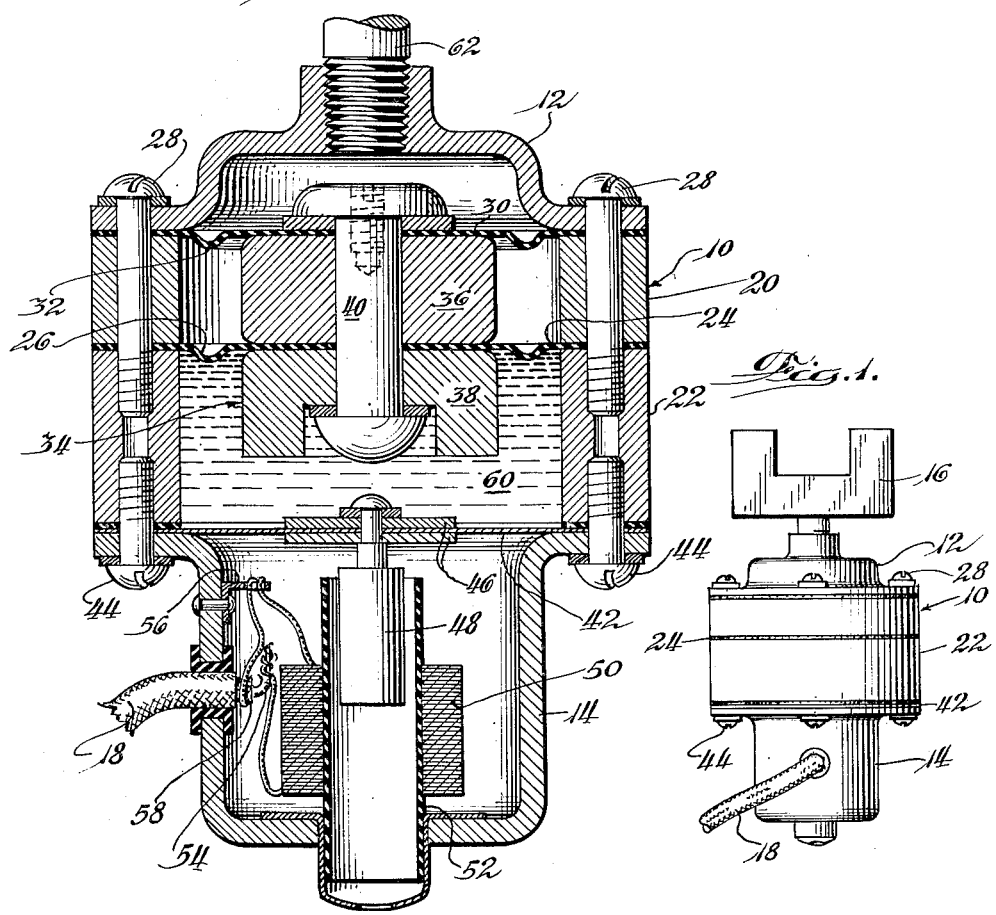
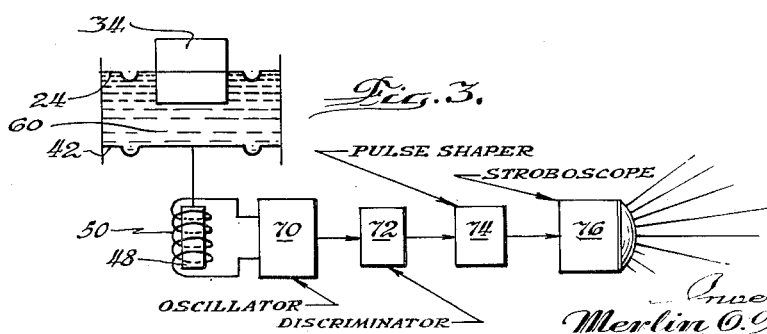
Inventors:
Merlin O. Petroff
Arthur C. Allen
By: Ahlberg, Knipper & Gradolph
Attorneys

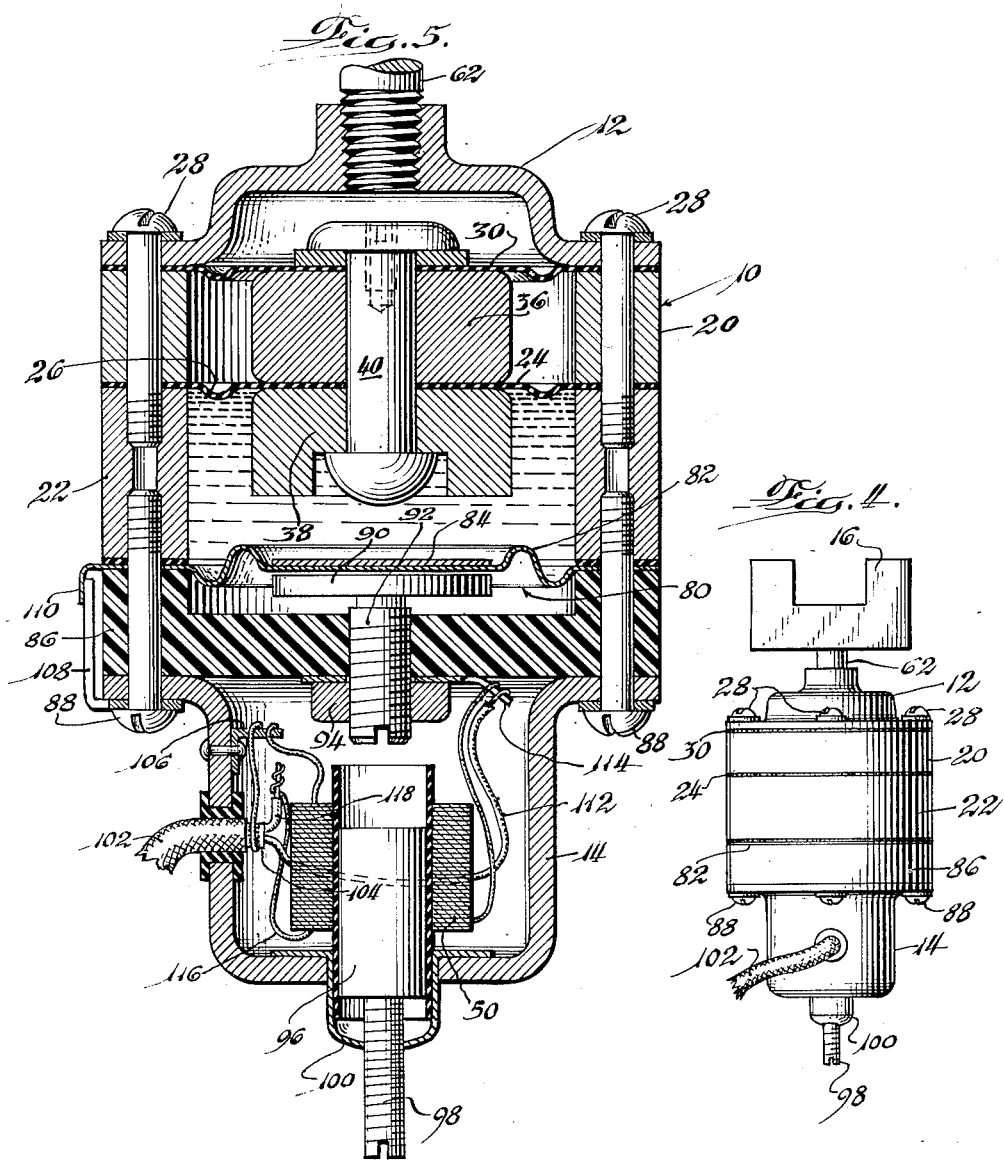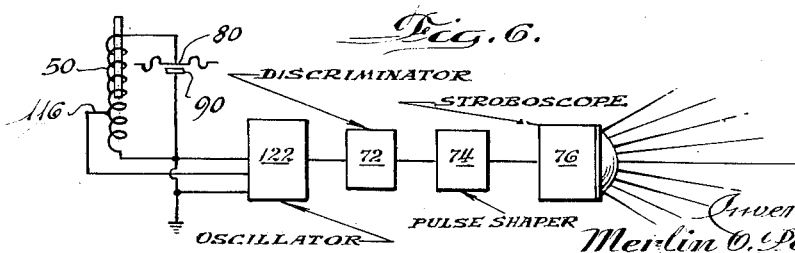

United States Patent Office 2,702,883
Patented Feb. 22, 1955

2,702,883

VIBRATION PICKUP

Merlin O. Petroff, Round Lake, and Arthur C. Allen, Chicago, Ill., assignors to Stewart-Warner Corporation, Chicago, Ill., a corporation of Virginia Application May 12, 1951, Serial No. 225,938

17 Claims. (Cl. 332—2)

This invention relates to pickups which produce electrical signals which vary in accordance with vibrations of a body.

An object of the invention is to provide improved pickups of the inertia operated type.

A further object is to provide improved pickups which are particularly well adapted for sensing the vibrations of a vehicle wheel which is being balanced.

A further object is to provide improved pickups which are relatively free from extraneous responses.

A further object is to provide improved pickups which have adequate response to extremely low vibration frequencies.

A further object is to provide pickups which are easily constructed, economical, and free from unnecessary complications.

A further object is to provide pickups which utilize liquid coupling between vibrating elements.

Further objects, advantages and features of the invention will become apparent from the following description of illustrative embodiments. In the course of the description reference will be made to the accompanying drawings, in which:

Fig. 1 is an elevational view illustrating the external appearance of a pickup constructed in accordance with the invention;

Fig. 2 is a central longitudinal sectional view of the pickup on an enlarged scale;

Fig. 3 is a diagrammatic illustration of a complete wheel balancing apparatus including the pickup;

Fig. 4 illustrates the external appearance in elevation of a modified pickup constructed in accordance with the invention;

Fig. 5 is a longitudinal central sectional view of the modified pickup; and

Fig. 6 is a diagrammatic illustration of a complete wheel balancing apparatus including the modified pickup.

The pickup of Fig. 1 includes a cylindrical housing 10 which has its open ends closed by cup-shaped end bells 12 and 14. A U-shaped permanent magnet 16 is mounted on the end bell 12 to provide means for securing the pickup to a vibrating body. An electrical cable 18 extends from the other end bell 14 to carry electrical signals from the pickup.

As shown in Fig. 2, the cylindrical housing 10 includes two coaxial cylindrical rings 20 and 22. A diaphragm 24 having an annular corrugation 26 is clamped between the rings 20 and 22 by means of longitudinal screws 28 which also serve to clamp the end bell 12 against the ring 20. A second diaphragm 30 having an annular corrugation 32 is clamped between the end bell 12 and the ring 20. The flanges of the bells 12 and 14 may be considered as "rings" because, although it is desirable, it is not essential that the ends of the housing 10 be enclosed, and rings and mounting brackets could be substituted for the end bells.

A massive weight 34 is carried by the diaphragms 24 and 30. The weight 34 includes two heavy rings 36 and 38, the ring 36 being positioned between the diaphragms and the weight 38 being suspended below the diaphragm 24. A bolt 40 extends axially through the rings 36 and 38 and the diaphragms to clamp the rings to the diaphragms.

A diaphragm 42 is clamped between the lower end bell 14 and the lower ring 22 by means of screws 44. The central part of the diaphragm 42 is sandwiched between a pair of backing discs 46 which support a cylindrical tuning slug 48 extending downwardly into the lower bell 14. The slug 48, which may be made from a magnetically permeable material, extends into an oscillator coil 50 which is mounted on a cylindrical form 52 supported by the lower end bell 14.

The electrical cable 18 has a central insulated conductor 54 which is connected to one end of the oscillator coil 50. The other end of the oscillator coil is connected to a lug 56 which is riveted to the lower bell 14. The cable 18 has an outer shielding braid 58 which is connected with the lug 56.

The chamber in the cylindrical lower ring 22 between the diaphragm 24 and the diaphragm 42 is filled with a liquid 60 such as a viscous oil.

The magnet 16 may be secured to the upper end bell 12 by means of a stud 62 threaded into the end bell 12.

As shown in Fig. 3, the coil 50 is a frequency determining element for an oscillator 70. The oscillator is coupled to a frequency modulation discriminator 72 which acts as a detector to produce signals corresponding to variations in the frequency of the oscillator 70. The signals produced by the discriminator are modified by a pulse shaper 74 so that they have the proper wave form for operating a stroboscope 76 in synchronization with the frequency variations of the oscillator 70.

Operation of the apparatus of Figs. 1–5

In the operation of the embodiment of Figs. 1 to 3, the pickup is secured to a vibrating body by means of the permanent magnet 16. The vibrating body may consist of a member suspending a vehicle wheel which is jacked up and freely rotating. The permanent magnet 16 is particularly convenient for supporting the pickup on a surface made from a magnetically permeable material. Of course, other supporting means may be supplied.

By means of the permanent magnet 16 or other supporting means, the end bells 12 and 14 and the cylindrical housing 16 are rigidly connected to the vibrating body. Consequently the housing rings 20 and 22 and the end bells 12 and 14 vibrate in unison with the vibrating body. Because of its mass, the weight 34 tends to remain stationary. Vibrations of the housing 10 with respect to the weight 34 are thereby set up to correspond with vibrations of the vibrating body. The diaphragms 24 and 30 may be made quite flexible and the weight 34 quite massive so that the pickup responds effectively to extremely low vibration frequencies. While it should be understood that the weight 34 tends to remain motionless as the body 10 vibrates relative to it, for the sake of simplicity in the following explanation it will be assumed that in this relative vibration of the body and the weight, the weight is the moving or vibrating element.

The vibrations of the weight 34 produce vibrations of the diaphragm 24. The vibrations of the weight 34 and the diaphragm 24 produce vibratory displacement of the liquid 60, and consequent pressure waves therein. The pressure waves in the liquid 60 vibrate the diaphragm 42, since the latter is sensitive to fluid pressure. Thus the vibrations of the weight 34 are transmitted to the diaphragm 42 by means of the liquid 60 between the diaphragm 24 and the diaphragm 42. The hydraulic coupling between the diaphragms 24 and 42 provides filtering to suppress extraneous high frequency vibrations. The liquid 60 also provides damping for the vibratory system including the weight 34 and the diaphragms 24 and 30, to suppress undesirable responses due to resonance effects in the vibrating system.

The vibrations of the diaphragm 42 produce relative vibratory movements of the tuning core or slug 48 and the oscillator coil 50. Since the coil 50 is the frequency determining element in the oscillator 70, the relative movements of the core and the coil shift the frequency of the oscillator in accordance with the vibrations of the body under test.

The frequency modulated signals produced by the oscillator 70 are demodulated by the discriminator 72. The resulting vibration signals are modified by the pulse shaper 74 in order to flash the stroboscope 76 in a definite fixed phase relationship with the vibrations of the body under test. The stroboscope is used to illuminate the rotating body in order to determine the location of unbalanced conditions in the body.

Although the pickup is inertia operated, it produces electrical signals corresponding closely to the instantaneous displacement of the vibrating body over a fairly wide frequency range. For frequencies well above the natural resonant frequency of the system including the weights 34 and the diaphragms 24 and 30, the relative vibrations of the casing 10 and the weight 34 correspond closely to the instantaneous vibrational displacement of the casing 10. The natural frequency of the system including the weight 34 on the diaphragms 24 and 30 may be made quite low by providing a massive weight and flexible diaphragms. Consequently the pickup is capable of producing signals corresponding to instantaneous vibrational displacement for vibrations having fairly low frequencies. The arrangement including the coil 50, the tuning slug 48, the oscillator 70 and the discriminator 72 produces signals which correspond closely to the instantaneous vibrational displacement of the diaphragm 42.

*Apparatus of Fig. 4–6*

A modified pickup is shown in Figs. 4 through 6. The modified pickup is similar in many respects to the embodiment of Figs. 1 through 3 and corresponding parts in the modified pickup have been given the same reference characters as applied in Figs. 1 to 3. The following description will be directed primarily to differences between the modified embodiment and the embodiment of Figs. 1 to 3. In other respects the two embodiments may be similar.

In Fig. 4 the diaphragm 42 of Fig. 20 has been replaced by a diaphragm 80 having an S-shaped annular corrugation 82. The upper side of the central portion of the diaphragm 80 is backed by a disc 84 which may be welded to the diaphragm.

In the embodiment of Fig. 5 a shallow insulating cup 86 is clamped between the lower bell 14 and the diaphragm 80 by means of bolts 88. A disc-shaped condenser electrode 90 is mounted in spaced relationship with the lower side of the diaphragm 80 by means of a stud 92 threaded axially through the insulating cup 86. The stud provides an adjustment of the spacing between the electrode 90 and the diaphragm 80. The stud may be locked in an adjusted position by means of a lock nut 94 threaded thereon. In the embodiment of Fig. 5 the tuning slug 48 is omitted. A tuning core or slug 96 positioned in the coil has a mounting stud 98 which is threaded through an insert 100 protruding axially from the lower end of the bell 14. The threaded stud on the tuning slug protrudes outwardly beyond the insert 100 to facilitate the adjustment of the slug.

An electrical cable 102 extends through the bell 14 for carrying signals from the pickup. The cable 102 has a shielding braid 104 which is connected to a lug 106 riveted to the lower bell 14. One end of the coil 50 is also connected to the lug. The diaphragm 80 is electrically connected to the lower bell 14 by means of a strap 108 welded to an ear 110 on the diaphragm and clamped under one of the bolts 88.

The cable 102 includes an insulated conductor 112 which is connected to a lug 114 clamped under the lock nut 94 and thereby connected to the condenser electrode 90. The opposite end of the coil 50 is also connected to the lug 114.

The coil has a tap 116 which is connected to a second insulated conductor 118 on the cable 102.

As shown in Figs. 5 and 6, the capacitance between the diaphragm 80 and the condenser electrode 90 is shunted across the coil 50. Variations of the capacitance between the diaphragm and the electrode shift the frequency of an oscillator 122, which corresponds with the oscillator 70 of Fig. 3. The tap 116 provides feedback for the oscillator 122. Thus the output of the oscillator 122 is frequency modulated in accordance with vibrations of the diaphragm 80. The frequency modulated signals are demodulated by the discriminator 72 and utilized to flash the stroboscope 76.

Like the pickup of Figs. 1 to 3, the pickup of Figs. 4 to 6 produces signals closely corresponding with instantaneous vibrational displacement of the casing over a fairly wide frequency range. The arrangement including the diaphragm 80, the electrode 90, the coil 50, the oscillator 122 and the discriminator 72 produces signals which correspond closely to instantaneous vibrational displacement of the diaphragm 80.

Many of the details of the embodiments described herein are merely illustrative and should not be taken as limitative. The invention may be practiced by many equivalent arrangements.

The scope of the invention is indicated by the following claims.

We claim:
1. In a vibration pickup, a body forming a chamber, first and second diaphragms forming walls of the chamber, means to produce vibrations of the first diaphragm, liquid filling the chamber to transmit vibrations from the first diaphragm to the second, and means to provide electrical signals which vary in accordance with vibrations of the second diaphragm.

2. In a vibration pickup, four coaxial rings, first, second and third diaphragms clamped between the respective rings, a massive body carried by the first and second diaphragms for producing vibrations of the diaphragms with respect to the rings, liquid positioned between the second and third diaphragms to transmit vibrations to the third diaphragm, and means to produce electrical signals which vary in accordance with vibrations of the third diaphragm.

3. In a vibration pickup, four coaxial rings, first, second and third diaphragms clamped between the respective rings, a massive body carried by the first and second diaphragms for producing vibrations of the diaphragms with respect to the rings, liquid positioned between the second and third diaphragms to transmit vibrations to the third diaphragm, and first and second elements forming an electrical impedance which varies in accordance with the vibrations of the third diaphragm, one of the elements being carried by the diaphragm and the other being supported by one of the rings, one of the elements being an inductance coil and the other being a slug movable adjacent the coil to change the inductance thereof.

4. In a vibration pickup, four coaxial rings, first, second and third diaphragms clamped between the respective rings, a massive body carried by the first and second diaphragms for producing vibrations of the diaphragms with respect to the rings, liquid positioned between the second and third diaphragms to transmit vibrations to the third diaphragm, and first and second elements forming an electrical impedance which varies in accordance with vibrations of the third diaphragm, one of the elements being carried by the diaphragm and the other being supported by one of the rings, one of the elements being a condenser plate carried by the third diaphragm and the other element being a condenser plate supported by one of the rings.

5. In a vibration pickup four coaxial rings, first, second and third diaphragms clamped between the respective rings, a massive body carried by the first and second diaphragms for producing vibrations of the diaphragms with respect to the rings, liquid positioned between the second and third diaphragms to transmit vibrations to the third diaphragm, an oscillator, and a pair of elements to vary the frequency of the oscillator in accordance with vibrations of the third diaphragm, one of the elements being carried by the diaphragm and the other being supported by one of the rings, one of the elements being an inductance coil forming a frequency determining part of the oscillator, and the other element being a slug movable adjacent the coil to change the inductance thereof.

6. In a vibration pickup, four coaxial rings, first, second and third diaphragms clamped between the respective rings, a massive body carried by the first and second diaphragms for producing vibrations of the diaphragms with respect to the rings, liquid positioned between the second and third diaphragms to transmit vibrations to the third diaphragm, an oscillator, and a pair of elements to vary the frequency of the oscillator in accordance with vibrations of the third diaphragm, one of the elements being carried by the diaphragm and the other being supported by one of the rings, the elements including a pair of spaced conductive surfaces providing condenser plates forming a frequency determining part of the oscillator.

7. In a vibration pickup, four coaxial rings, first, second and third diaphragms clamped between the respective rings, a massive body carried by the first and second diaphragms for producing vibrations of the diaphragms with respect to the rings, liquid positioned between the second and third diaphragms to transmit vibrations to the third diaphragm, and an oscillator including a pair of frequency determining components which are relatively movable to shift the frequency of the oscillator, one of the components being carried by the third diaphragm and the other being supported by one of the rings in order to vary the frequency of the oscillator in accordance with vibrations of the third diaphragm.

8. In a vibration pickup, a body forming a chamber which is closed except for first and second apertures, first and second diaphragms closing the apertures, means to vibrate the first diaphragm with respect to the body, liquid filling the chamber to transmit vibrations from the first diaphragm to the second diaphragm, and a variable electrical impedance operated by the second diaphragm to cause its impedance to vary in accordance with vibrations of the second diaphragm.

9. In a vibration pickup, a body forming a chamber which is closed except for first and second apertures, first and second diaphragms closing the apertures, a massive weight carried by the first diaphragm to produce vibrations thereof with respect to the chambered body, liquid filling the chamber to transmit vibrations from the first diaphragm to the second, and a variable electrical impedance operated by the second diaphragm to cause its impedance to vary in accordance with vibrations thereof.

10. In a vibration pickup, a body forming a chamber which is closed except for first and second apertures, first and second diaphragms closing the apertures, a massive weight carried by the first diaphragm to produce vibrations thereof with respect to the chambered body, liquid filling the chamber to transmit vibrations from the first diaphragm to the second, and a pair of elements forming an electrical impedance which varies in accordance with vibrations of the second diaphragm, one of the elements being carried by the diaphragm and the other being supported by the chambered body, one of the elements being an inductance coil and the other a slug movable adjacent the coil to vary the inductance thereof.

11. In a vibration pickup, a body forming a chamber which is closed except for first and second apertures, first and second diaphragms closing the apertures, a massive weight carried by the first diaphragm to produce vibrations thereof with respect to the chambered body, liquid filling the chamber to transmit vibrations from the first diaphragm to the second, and a pair of elements to provide signals which vary in accordance with vibrations of the second diaphragm, one of the elements being carried by the diaphragm and the other being suported by the chambered body, the elements being first and second spaced conductive surfaces forming condenser plates.

12. In a vibration pickup, a body forming a chamber which is closed except for first and second apertures, first and second diaphragms closing the apertures, a massive weight carried by the first diaphragm to produce vibrations thereof with respect to the chambered body, liquid filling the chamber to transmit vibrations from the first diaphragm to the second, and an oscillator having a pair of frequency determining elements which are relatively movable to shift the frequency of the oscillator, one of the elements being carried by the second diaphragm and the other being supported by the chambered body, one of the elements being an inductance coil and the other being a slug movable adjacent the coil to vary the inductance thereof.

13. In a vibration pickup, a body forming a chamber which is closed except for first and second apertures, first and second diaphragms closing the apertures, a massive weight carried by the first diaphragm to produce vibrations thereof with respect to the chambered body, liquid filling the chamber to transmit vibrations from the first diaphragm to the second, and an oscillator having a pair of frequency determining elements which are relatively movable to shift the frequency of the oscillator, one of the elements being carried by the second diaphragm and the other being supported by the chambered body in order to vary the frequency of the oscillator in accordance with the vibrations of the second diaphragm.

14. In a vibration pickup, a body forming a chamber which is closed except for first and second apertures, first and second diaphragms closing the apertures, a massive weight carried by the first diaphragm to produce vibrations thereof with respect to the chambered body, liquid filling the chamber to transmit vibrations from the first diaphragm to the second, and an oscillator having a pair of frequency determining elements which are relatively movable to shift the frequency of the oscillator, one of the elements being carried by the second diaphragm and the other being supported by the chambered body, the elements including spaced surfaces carried by the second diaphragm and the chambered body to form plates of a condenser which varies to shift the frequency of the oscillator in accordance with vibrations of the second diaphragm.

15. In a vibration pickup, a body forming a chamber which is closed except for first and second apertures, first and second diaphragms closing the apertures, a massive weight carried by the first diaphragm, means to vibrate the chambered body to produce relative vibrations of the first diaphragm and the body, liquid filling the chamber to transmit vibrations from the first diaphragm to the second, and means connected to the second diaphragm to provide signals which vary in accordance with vibrations of the second diaphragm.

16. In a vibration pickup, a body providing a closed chamber, liquid filling the chamber, means in the chamber to produce vibratory pressure waves in the liquid, pressure sensitive means in the chamber, and a variable electrical impedance operated by the pressure sensitive means to vary its impedance in accordance with the vibratory pressure waves.

17. In a vibration pickup, a body providing a closed chamber, liquid filling the chamber, movable means in the chamber including a massive weight, means to vibrate the chambered body to produce relative vibrations of the weight and the body and thereby to produce vibratory pressure waves in the liquid, pressure sensitive means in the chamber, and a variable electrical impedance operated by the pressure sensitive means to vary its impedance in accordance with the vibratory pressure waves.

References Cited in the file of this patent

UNITED STATES PATENTS

| Number | Name | Date |
|---|---|---|
| 1,919,480 | Rieber | July 25, 1933 |
| 2,008,713 | Hayes | July 23, 1935 |
| 2,424,724 | Tolk | July 29, 1947 |
| 2,430,757 | Conrad et al. | Nov. 11, 1947 |
| 2,559,454 | Mesa | July 3, 1951 |
| 2,571,899 | Kroft et al. | Oct. 16, 1951 |